United States Patent [19]

Chludzinski et al.

[11] Patent Number: 4,473,622
[45] Date of Patent: Sep. 25, 1984

[54] RAPID STARTING METHANOL REACTOR SYSTEM

[76] Inventors: Paul J. Chludzinski, 38 Berkshire St., Swampscott, Mass. 01907; Philip Dantowitz, 39 Nancy Ave., Peabody, Mass. 01960; James F. McElroy, 12 Old Cart Rd., Hamilton, Mass. 01936

[21] Appl. No.: 453,247
[22] Filed: Dec. 27, 1982
[51] Int. Cl.³ .............................................. H01M 8/18
[52] U.S. Cl. ...................................... 429/19; 429/20; 429/26; 48/61; 422/204; 201/15; 201/37
[58] Field of Search ............................ 429/19, 20, 26; 422/193, 203, 204; 201/15, 27, 37; 48/61

[56] References Cited

U.S. PATENT DOCUMENTS

| | | | |
|---|---|---|---|
| 1,517,526 | 12/1924 | Barnebey | 422/204 |
| 2,246,684 | 6/1941 | Hurt | 422/203 X |
| 3,321,333 | 5/1967 | Palmer | 429/20 |
| 4,206,032 | 6/1980 | Friedman et al. | 422/203 X |

*Primary Examiner*—George T. Ozaki
*Assistant Examiner*—Stephen J. Kalafut

[57] ABSTRACT

The invention relates to a methanol-to-hydrogen cracking reactor for use with a fuel cell vehicular power plant. The system is particularly designed for rapid start-up of the catalytic methanol cracking reactor after an extended shut-down period, i.e., after the vehicular fuel cell power plant has been inoperative overnight. Rapid system start-up is accomplished by a combination of direct and indirect heating of the cracking catalyst. Initially, liquid methanol is burned with a stoichiometric or slightly lean air mixture in the combustion chamber of the reactor assembly. The hot combustion gas travels down a flue gas chamber in heat exchange relationship with the catalytic cracking chamber transferring heat across the catalyst chamber wall to heat the catalyst indirectly. The combustion gas is then diverted back through the catalyst bed to heat the catalyst pellets directly. When the cracking reactor temperature reaches operating temperature, methanol combustion is stopped and a hot gas valve is switched to route the flue gas overboard, with methanol being fed directly to the catalytic cracking reactor. Thereafter, the burner operates on excess hydrogen from the fuel cells.

4 Claims, 3 Drawing Figures

RAPID STARTING METHANOL REACTOR SYSTEM

The Government has rights in this invention pursuant to contract number W-7405-ENG-36 awarded by the U.S. Department of Energy.

This invention relates to a system and process for rapidly and efficiently converting a reformable fuel into hydrogen for oxidation at an anode of a fuel cell and more particularly one for rapidly initiating cracking a reformable hydrocarbon fuel.

Reforming of hydrocarbon fuel such as methanol or the like to produce hydrogen as a fuel for fuel cells have been proposed in the past. One form of such a conversion system includes both a catalytic reactor for producing hydrogen and carbon monoxide from a hydrocarbon such as methanol fuel and a shift reactor in which the carbon monoxide undergoes a "water shift" reaction $$CO + H_2O \rightarrow CO_2 + H_2$$

which converts carbon monoxide, which is noxious and health threatening and also has a tendency to poison the catalyst in the fuel cell, to carbon dioxide and additional hydrogen. In such systems the catalytic cracking reactor must be maintained at a temperature sufficiently high, usually about 572° F., to initiate and maintain the methanol cracking reaction. In normal systems where fuel cells are used for electrical power generation, an interval of 15 to 20 minutes is normally necessary to bring the cracking reactor up to temperature.

Recently, however, much attention is being paid to the use of fuel cells and reformable fuel systems for vehicular power supplies. When used as a vehicular power supply, the vehicle and the fuel cell power supply will in many instances be in a dormant non-operative stage for long periods of time. Thus, for example, in an automotive vehicle, the vehicle will typically be subject to extended shut-down periods, i.e. overnight when the vehicle is not being used. After such an extended shut-down period it is necessary to initiate operation fairly rapidly; i.e., in a minute or less. It is thus necessary to reduce the time period for starting the methanol cracking reactor to less than a minute, since a 15 or 20 minute warm-up period is totally unacceptable in a vehicular power plant.

Bringing the catalytic methanol cracking unit to operation rapidly without overheating or damaging the catalytic material is a formidable problem since the temperature of the catalytic cracking bed must be brought to cracking temperature, 572° F.–800° F., rapidly but without overheating the catalyst. Applicant has found this may be readily achieved during start-up operation by using methanol and air in the burner and passing the hot combustion gas through a chamber surrounding the catalyst thus transferring heat indirectly to the catalytic bed. The combustion gas is then diverted back through the catalytic bed directly heating the catalyst particles and cracking some of the residual methanol. The maximum temperature of the combustion gas is conrolled by the injection of water to quench the gas temperature and maintain it at 800°F. When the system reaches operating temperature, about 900° F., methanol is no longer used as fuel with excess hydrogen from the fuel cell being fed to the burner to provide the heating gas and methanol is now fed directly to the catalytic cracking reactor.

It is, therefore, a principal objective of the instant invention to provide rapid conversion of a reformable fuel to hydrogen from a cold or inoperative state.

Another objective of the invention is to provide rapid start-up of a methanol-to-hydrogen catalytic cracking reactor for a vehicular power plant.

Still another objective of the invention is to provide a methanol-to-hydrogen catalytic cracking reactor which is capable of rapidly reaching operating conditions after an extended shut-down period.

Other objectives and advantages of the invention will become apparent with the description thereof.

Various objectives of the invention are realized in an arrangement in which the catalytic cracking reactor for the organic reformable fuel, such as methanol, is both indirectly and directly heated during start-up to provide a rapid start system, less than a minute for initiating the cracking reaction. To this end, during start-up reformable organic fuel such as methanol is first burned with air in a burner and passed through a flue gas chamber which is in heat exchange relationship with the catalytic cracking reactor to transfer heat and raise the temperature of the catalyst. The gas stream is then diverted through the catalytic bed to heat the catalytic particles directly and bring them rapidly to temperature. The maximum temperature of the gas stream is controlled by water injection or quenching to prevent damage to the catalyst by overheating. When the system reaches operating temperature the methanol is diverted from the burning chamber and is simply passed directly through the cracking chamber while excess hydrogen from the fuel cell is passed into the burner as fuel for maintaining a flue gas stream in heat exchange relationship with the catalytic bed to maintain it at temperature.

The novel features which are believed to be characteristic of the invention are set forth with particularity in the appended claims. The invention itself, however, both as to its organization and method of operation together with further objectives and advantages thereof may best be understood by reference to the following description taken in connection with the accompanying drawings in which:

Figure 1:
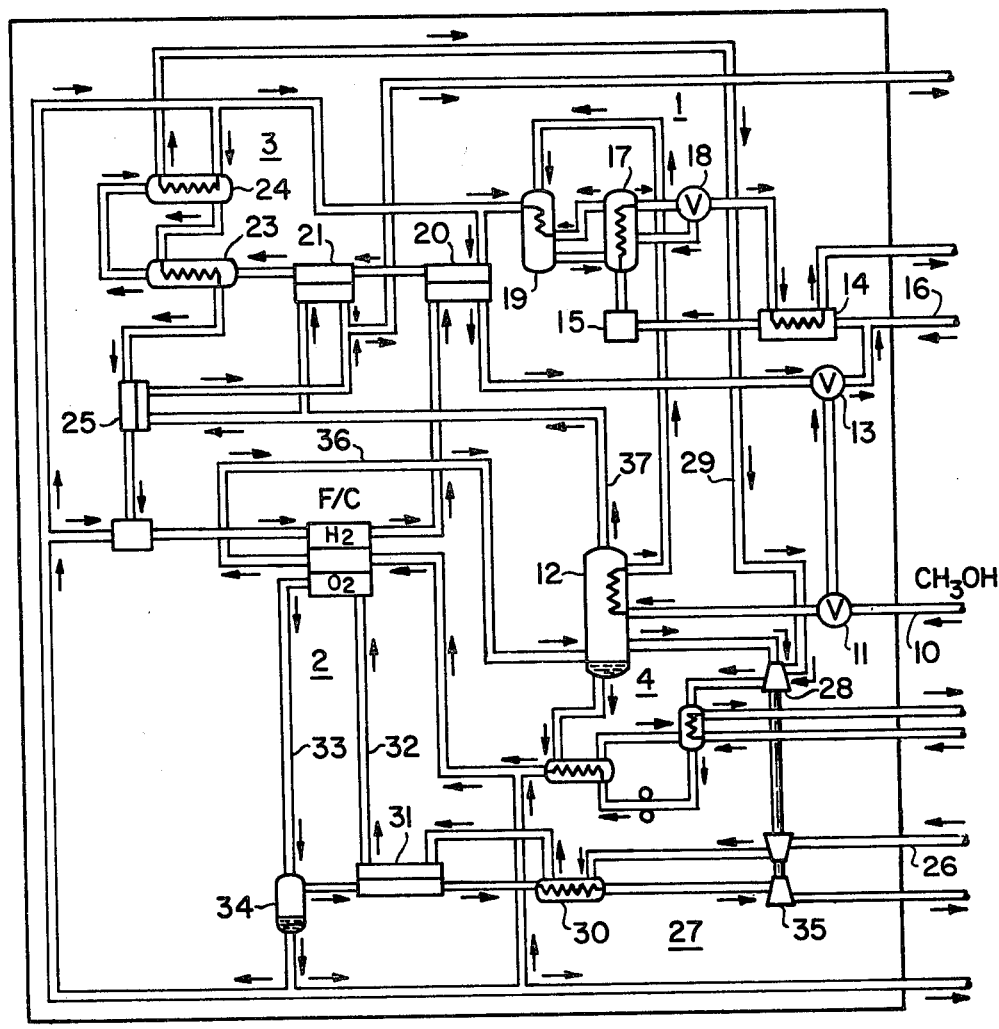
FIG. 1 is a schematic block diagram of the fuel cell system including the methanol cracking arrangement.

FIG. 1 shows a block diagram and flow chart for a methanol/air fuel cell assembly which includes a rapid start-up arrangement for the catalytic methanol cracking reactor. The methanol/air fuel cell system illustrated in FIG. 1 comprises essentially four components. A catalytic cracking reactor 1 for converting a reformable organic fuel such as methanol to produce hydrogen as a fuel for a fuel cell stack 2. A CO shift reactor assembly 3 in which the hydrogen and carbon monoxide from the methanol cracking reactor is subjected to a water shift reaction to convert the carbon monoxide to carbon dioxide with the production of additional hydrogen. The output from the CO shift reactor 3 is then supplied as the fuel gas to the fuel cell stack 2. Waste heat from the fuel cell and the shift reactor is converted to steam which is utilized in a methanol vaporizer and in power generator assembly 4 to provide useful work in a mechanical compressor-expander which operates on the fuel cell reaction air. By thus utilizing the waste heat of the fuel cell stack by boiling water within the cell coolant chamber and utilizing the steam to vaporize methanol, and steam from the shift reactor exothermic reaction to provide useful work in the mechanical expander assembly, the efficiency of the overall vehicular power source is substantially enhanced.

CATALYTIC METHANOL CRACKING REACTOR WITH RAPID START-UP

A reformable hydrocarbon fuel such as liquid methanol is introduced via an input line 10 to a start-up valve 11 which during normal operation passes the liquid methanol to a methanol vaporizer 12. During start-up valve 11 diverts the methanol through fuel control valve 13 to a pre-heater 14 and burner 15 to the methanol cracking reactor. The liquid methanol is combined with incoming combustion air from line 16 and introduced to the pre-heater 14. The methanol air mixture is maintained at a stoichiometric or preferably less than stoichiometric ratio to prevent excess oxygen from passing through the catalytic cracking reactor during start-up as the oxygen has a tendency to damage the catalytic pellets. By maintaining a lean or less than stoichiometric ratio of oxygen to methanol the excess unburned methanol can also be used in passing through the catalytic bed to produce the hydrogen and carbon monoxide which is passed to the CO shift reactor during start-up. The methanol-air combination is passed through the burner where it is burned to produce hot combustion gases which bring the catalytic cracking bed up to the temperature at which cracking reaction is initiated (572° F.) by passing it through a flue chamber inside of the methanol cracking reactor 17. During start-up the hot flue gas is recirculated by cracking control valve 18 through the catalytic cracking bed itself. The flue gas thus heats the catalytic cracker both directly and indirectly. The carbon monoxide and hydrogen produced in catalytic cracker 17 by the reaction:

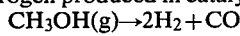

is then passed through a heating chamber 19. The heated reformate is passed through an anode exhaust dryer 20 which comprises a two chamber device separated by a water vapor transporting membrane. The heated reformate is passed into one chamber and humidified exhaust hydrogen gas from the anode chambers of the fuel cell stack is passed through the other chamber of the dryer. Water vapor from the anode exhaust is transported across the membrane to the higher temperature reformate stream thereby drying the hydrogen and partially humidifying the reformate. The dried hydrogen passes out of the chamber to preheater valve 13. Valve 13 is switched to feed excess $H_2$ from the fuel cell to the preheater and burner once the methanol catalytic cracking reactor comes up to operating temperature.

The partially humidified reformate gas stream from $H_2$ dryer 20 then passes to one chamber of a humidifer 21 which is of the same construction as that of the dryer. That is, it consists of two chambers separated by a membrane capable of transporting water from one stream to the other. The partially humidified reformate in one chamber absorbs water transported across the membrane from the other chamber to which steam from the fuel cell cooling chamber and methanol vaporizer chamber 12 is brought. The humidified reformate is introduced into a CO shift reactor preheater 23 and then into the CO shift reactor 24 where the combination of carbon monoxide and water undergo an exothermic "water shift" discussed previously in which carbon monoxide is converted to carbon dioxide and additional hydrogen is produced. Shift reactors of this type are well known and will not be described in detail here.

The temperature of the hydrogen and carbon dioxide from the shift reactor is quite high (390° F.) because of the exothermic nature of the "water shift" reaction. The gases are passed through a flue chamber back in shift preheater 23 to heat the incoming humidified reformate. The hydrogen and carbon dioxide passes through anode humidifier 25 of the manner and type previously described in which the hydrogen fuel gas is humidified by means of steam from the vaporizor 12 passing through one of the chambers separated by the membrane and the humidifier. The output from the anode fuel gas humidifier is then passed through a gas conditioner into the anode chambers of fuel cell stack 2.

The fuel charge enters the fuel cell anode chamber which is separated from the cathode chamber by an ion transporting membrane having electrodes at opposite surfaces to produce electrical power. Fuel cells of the membrane type are well known devices and reference is hereby made to U.S. Pat. Nos. 3,297,484; 3,392,058 and 3,432,355 all of which describe such membrane fuel cells. As the hydrogen is used up in the anode chamber, water vapor condenses from the gaseous stream onto the membrane electrode assembly and is prototonically pumped across the membrane from the fuel side to the air side where it appears as liquid water. After the fuel exhaust stream leaves the anode chamber of the fuel cells it passes through anode exhaust dryer 20 to valve 13. During normal operation the exhaust $H_2$ is mixed with a stoichiometric (or slightly lean) air, preheated in preheater 14 and burned to form the hot flue gas during normal operation; flue gas which supports the cracking reaction. The flue gas, in normal operation, then leaves the cracking chamber through valve 18 to be exhausted overboard.

REACTION AIR PROCESSOR

Reaction air is brought in through an inlet conduit 26 to the compressor portion of a compressor-expander 27 which is part of a free piston compressor 28 to which steam from vaporizor 12 and excess steam from the CO water shift reactor 24 is supplied over line 29.

Reaction air for the cathode chambers of the fuel cells is compressed in the compressor portion. Some of the heat of expansion from the reaction air is removed in a reaction cooler 30 by heat exchanging with the exhaust air from the cathodes of the fuel cells. The reaction air is then humidified by absorbing water from the exhaust via water transport membranes in the exhaust air economizer 31. The water exchanger 31 is again a dual chamber arrangement with a water transporting membrane separating it into chambers with the humidified exhaust air passing through one chamber and the heated compressed reaction air passing through the other chamber. Water vapor is transported across the membrane from the exhaust air to the reaction air humidifying the same with the reaction air then being transported over conduit 32 to the cathodes of the fuel cell stack. It is not necessary to saturate the feed air completely since condensed water from the fuel side which is transported across the cell membranes and reaction product water formed at the cathode of the fuel cell produces enough water to saturate the air stream and prevent membrane drying. The air reacts in the air chambers and the saturated water vapor and may also carry liquid product water. This exhaust air is then fed via conduit 33 to a liquid vapor separator 34 where the liquid water is separated from the exhaust air. The exhaust air then completes the path to the exhaust air water economizer 31 and cooler 30 and then to the expander 35 of the compressor expander combination 27.

The cooling system and waste heat conversion for the fuel cell stacks operates as follows. Liquid water enters cell and passes through the bipolar current collector between adjacent cells of the cell stack. Cooling water enters at a relatively high temperature, although below the boiling temperature. In passing through the cooling passages in the bipolar current collectors between cells the exhaust heat from the fuel cell evaporates the cooling water to steam. The steam exiting from the fuel cells is then transported via conduit 36 to methanol vaporizer 12 where it provides heat from methanol vaporization during normal operation. Some of the steam exits the vaporizer over line 37 and feeds humidifiers 25 and 21 of the fuel gas conditioning and CO shift reactor section. The remaining steam which is generated by the exothermic reaction in CO shift reactor 24 is fed to the free piston compressor and the compressor expander in section 4 to compress the reaction air.

Figure 2:
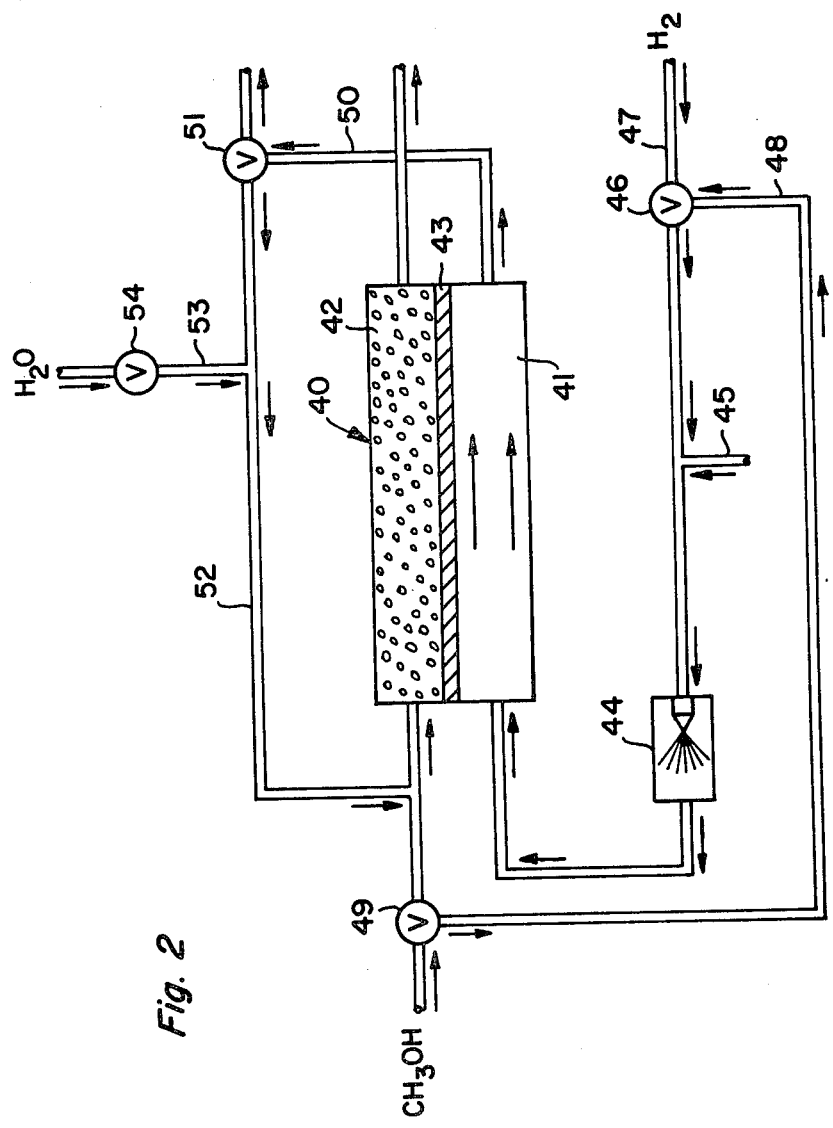
FIG. 2 is a schematic representation of the rapid-start methanol catalytic cracking reactor.

FIG. 2 illustrates schematically the manner in which quick start-up of the methanol catalytic cracking reactor is provided by initially burning methanol and air to provide both indirect and direct hetaing of the catalyst in the cracking bed. Quick start methanol reactor comprises a two-chamber housing 40 comprising heating flue gas chamber 41 and a catalytic cracking chamber 42 separated by a heat transferring wall 43. Heated combustion gases from burner 44 pass through flue gas chamber 41. The input to burner 44 is a combination of liquid methanol and stoichiometric (or lean) air from conduit 45 and fuel valve 46. The input to fuel valve 46 is through a conduit 47 through which exhaust hydrogen from the fuel cell anode chamber is provided and through a conduit 48 which is coupled to the start-up valve 49. The inlet to valve 49 is from a liquid methanol storage source and during start-up the valve 49 is positioned to pass the methanol through conduit 48 and valve 46 to the burner to produce a heated flue gas which is a combination of air and burned methanol. The heated flue gas passes through the chamber 41 transferring some of its heat through wall 43 to preheat the catalytic particles in cracking chamber 42. The flue gas exits chamber 41 via conduit 50 to a hot gas valve 51 which in the starting mode recirculates the hot air over conduit 52 to the inlet of the cracking chamber 42. Combustion gases are passed over the catalytic pellets and directly heats the particles to accelerate heating of the pellets to the cracking temperature. Because the mixture of methanol and air is lean in air, i.e., slightly less than stoichiometric, part of the unburned methanol is cracked in the cracking bed to produce CO and $H_2$ which exits the chamber and is introduced to the shift reactor where the carbon monoxide is converted to carbon dioxide and additional hydrogen is produced.

Feedback conduit 52 through which the flue gas combination is fed back to the catalytic bed is connected with a water inlet conduit 53 which is controlled by valve 54 to controllably inject water into the flue gas stream to prevent overheating and damage to the catalytic pellets by limiting the gas stream temperature to a predetermined maximum temperature, typically 800° F. The temperature of the gas stream is measured by a temperature sensing element, such as a thermocouple, not shown, positioned in the chamber. When the gas temperatures reach the predetermined maximum temperature, valve 54 is actuated to inject water into the hot flue gas stream to prevent the temperature from rising above 800° F.

Whenever the methanol cracking reactor reaches operating temperature which is preferably approximately 950° F., valve 51 is switched to interrupt feedback of the flue gas through the cracking bed and to allow the hot flue gas to flow overboard of this system. Simultaneously, water valve 54 is closed to prevent further water injection; valve 46 is switched to interrupt the flow of the methanol to the burner and switching excess hydrogen from the fuel cell exhaust to the burner as a fuel. Similarly, start-up valve 49 is also switched to feed gaseous methanol from the methanol vaporizer directly to the catalyst bed and the system then continues to operate normally to crack the vaporized methanol to produce the carbon monoxide and hydrogen.

Figure 3:
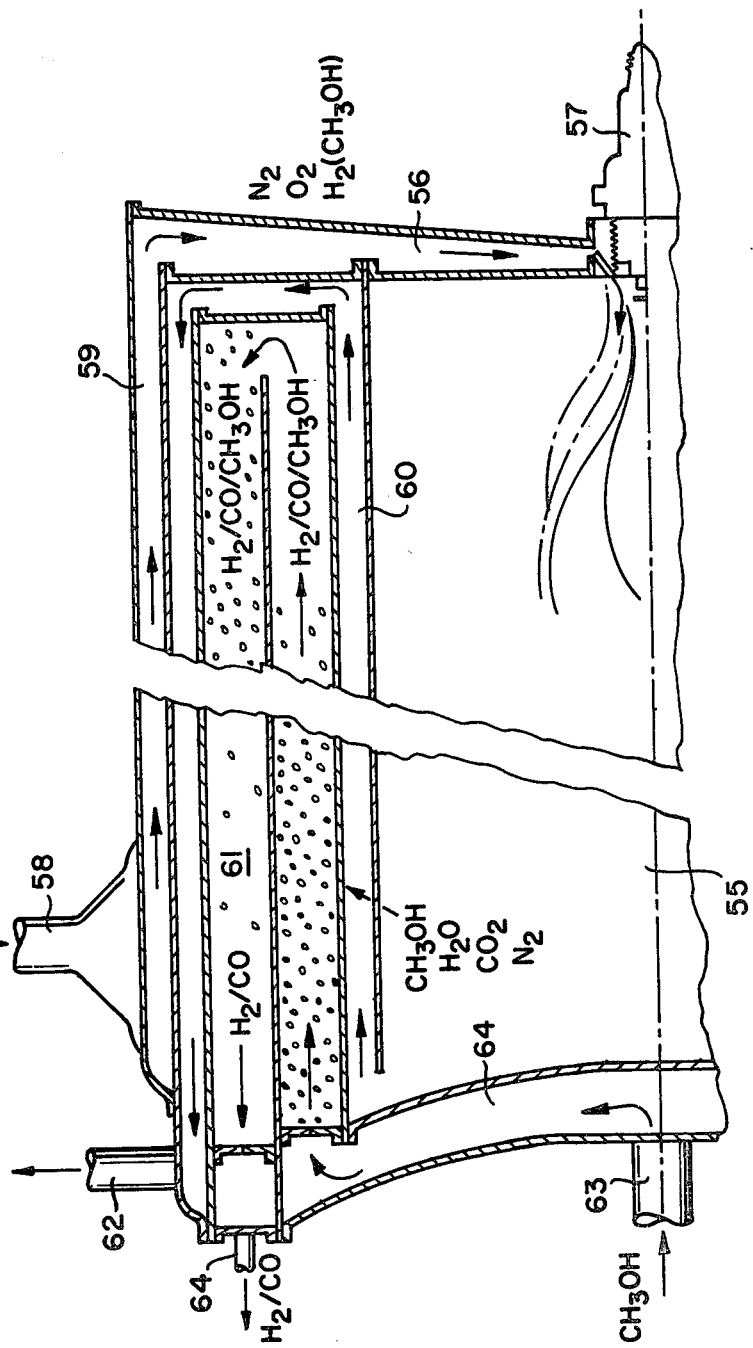
FIG. 3 is a partial sectional view of integral methanol catalytic reactor/burer/air pre-heater.

FIG. 3 illustrates an embodiment of an integrated methanol reactor/burner/air preheater arrangement which combines elements 14, 15 and 17 of FIG. 1 in a single structure. The integrated assembly includes a central combustion chamber 55 which communicates with the air/fuel passage 56. A firing spark plug 57 extends through the side wall into combustion chamber 55. An air/fuel mixture passes from inlet 58 to an annular fuel preheater passage 59. Passage 59 is in heat exchange relationship with an annular flue gas chamber 60 which communicates with combustion chamber 55. The combustion or flue gases pass through annular fuel gas chamber 60 which surrounds and is in heat exchange reiationship with an annular two-chamber catalytic cracking bed 61. Cracking chamber 61 contains catalytic pellets which are preferably zinc and copper deposited on an alumina substrate. Heated flue gases from combustion chamber 55 transfer heat across the walls of annular catalytic chamber 61 to heat the catalytic pellets in the chamber indirectly. The flue gas continues through chamber 60 and passes into an outlet conduit 62. In passing through the flue gas chamber the flue gas also comes into heat exchange relationship with annular air/fuel preheater passage 59, preheating the air/fuel mixture prior to combustion in chamber 55. Preheating the air/fuel mixture, whether liquid methanol or ultimately the excess hydrogen from the fuel cell aids in the combustion of the mixture which, as has been pointed out previously, is usually maintained at a stoichiometric or less than stoichiometric ratio in order to avoid the passage of oxygen over the catalytic cracking pellets. By preheating the mixture, combustion of the mixture in the combustion chamber is readily achieved.

During the starting mode the flue gas which contains an excess of methanol passes through the outlet conduit 62 through a suitable valve, not shown, and back into the inlet conduit 63 for the annular catalytic cracking bed. The heated flue gas mixture passes through conduit 63 into passage 64 and thence directly through catalyst bed 61. The heated flue gas stream heats the catalytic particles and rapidly brings them up to temperature at which cracking takes place. It is readily apparent that the structure of FIG. 3 in which an annular, two-pass catalytic cracking bed is surrounded by an annular flue gas assembly which in turn contacts an annular air/fuel preheater maximizes heat transfer to the cracking bed and to the air/fuel mixture results in rapid warm up of the catalytic cracking reactor and permitting operation of the system from an inoperative stage in a very short period of time, one (1) minute or less. After the system reaches operating temperature the control valves, not shown, convert the fuel input to the preheater from liquid methanol to excess hydrogen from fuel cell anode chambers and diverts the liquid methanol directly into catalytic cracking reactor chamber 61. Similarly, the flue gas valve is actuated to prevent recirculation of the flue gases through the catalytic cracking chamber and out an overboard disposal of the flue gas.

The humidifiers or water vapor transfer devices, as pointed out previously, are dual chamber devices with the chambers separated by polymeric membranes which are capable of transferring water vapor or liquid vapor from one chamber to the other thereby permitting humidification of one gas stream to another even though the total pressures of the streams may be different. The use of water and vapor transport membranes between the chambers to facilitate water exchange is most effective since it avoids the traditional approach of cooling one stream, condensing the water, separating the liquid water, adding it to the other stream and then heating to revaporize the water. The precise construction and method of operation of such a water vapor exchange and humidification device is specifically described and claimed in a copending application, Ser. No. 453,249 entitled, "Water Vapor Exchange System," filed Dec. 27, 1982, concurrently with this application in the names of Phillip Dantowitz, Paul J. Chludzinski and James F. McElroy and is assigned to the General Electric Company, the assignee of the present invention; the subject matter of which application is hereby specifically incorporated by reference.

It is apparent from the foregoing description that a rapid start-up arrangement has been provided for an organic fuel cracking reactor which makes it highly effective in a fuel cell power source for a vehicular power plant.

While the instant invention has been shown in connection with certain preferred embodiments thereof and certain preferred processes for achieving the end result, the invention is by no means limited to these embodiments or these procedural sequences since other modifications of the instrumentalities employed and of the steps of the process may be made still fall within the scope of the invention. It is contemplated by the appended claims to cover any such modifications that fall within the true scope and spirit of this invention.

What we claim is new and desire to be secured by Letters Patent of the United States is:

1. A rapid start hydrocarbon catalytic cracking system comprising:
   a. a catalytic cracking reactor for a reformable hydrocarbon,
   b. means for rapidly bringing the catalytic cracking reactor to cracking temperature including:
      (1) combustion means for burning a mixture of the reformable hydrocarbon and air during start-up and hydrogen after said reactor reaches cracking temperature,
      (2) means for passing combustion gases from said combustion means into heat exchange relationship with the housing of said reactor for indirectly heating the catalyst in said reactor,
      (3) means for passing the combustion gases through the reactor for directly heating the catalyst in said reactor,
   c. means for terminating passage of the combustion gases through the reactor when the reactor reaches cracking temperature for the hydrocarbon and thereafter passing the hydrocarbon through said reactor to form hydrogen, and
   d. means to supply a portion of said hydrogen to said combustion means to maintain indirect heating of the catalysts by combustion gases from burning of said hydrogen.

2. A fuel cell power system comprising:
   a. a fuel cell stack,
   b. means for providing fuel gas to said stack including means for catalytically cracking a hydrocarbon to produce hydrogen as the fuel gas,
   c. means for rapidly bringing said catalytic cracking means to cracking temperature including:
      (1) combustion means for burning the hydrocarbon and air to produce a combustion gas stream, including means for introducing hydrocarbon and air to said combustion means and not to said cracking means during said start-up,
      (2) means for bringing said combustion gas stream into heat exchange relationship the exterior of said catalytic cracking means for indirectly heating the catalytic means, and
      (3) means for introducing the heated combustion gas stream into the catalytic cracking means for directly heating the catalyst
   d. means responsive to the cracking means reaching cracking temperature for terminating passage of said hydrocarbon to said combustion means and for terminating introduction of the heated combustion stream to said cracking means,
   e. means for switching said hydrocarbon to said cracking means after cracking temperature is reached to reform said hydrocarbon and produce gaseous hydrogen, and
   f. means to introduce excess hydrogen from said fuel stack to said combustion means after cracking temperature is reached.

3. The fuel cell power system according to claim 2 wherein the hydrocarbon is diverted from said burning means when said cracking means reaches operating temperature, and means for supplying exhaust hydrogen from said fuel cells to the burning means.

4. An integrated catalytic hydrocarbon cracking reactor, combustor and heater comprising:
   a. a combustion chamber,
   b. means to introduce a reformable fuel/air mixture to said chamber to produce a combustion gas stream,
   c. an annular catalytic cracking chamber surrounding said combustion chamber,
   d. an annular combustion gas stream chamber surrounding and coaxial with said combustion chamber and communicating therewith,
   e. said gas chamber surrounding said cracking chamber to transfer heat thereto and indirectly heat the catalyst in said chamber,
   f. means for selectively transporting the combustion gas stream from said gas chamber into and through said annular cracking chamber during start-up to heat the catalyst directly, and
   g. selectively actuated means for introducting the reformable fuel to said cracking chamber after start-up to produce gaseous hydrogen.

* * * * *